US011186333B2

(12) United States Patent
Watson et al.

(10) Patent No.: US 11,186,333 B2
(45) Date of Patent: Nov. 30, 2021

(54) DRIVE SHAFT SUPPORT DEVICES AND METHODS OF SUPPORTING DRIVE SHAFTS FOR ASSEMBLY

(71) Applicant: Toyota Motor Engineering & Manufacturing North America, Inc., Plano, TX (US)

(72) Inventors: Michael D. Watson, Ewing, KY (US); Shad McCord, Ewing, KY (US); James C. Greenlee, II, Paris, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 77 days.

(21) Appl. No.: 16/704,363

(22) Filed: Dec. 5, 2019

(65) Prior Publication Data
US 2021/0171138 A1   Jun. 10, 2021

(51) Int. Cl.
*B62D 65/02* (2006.01)
*B23P 19/04* (2006.01)
*B25B 11/02* (2006.01)

(52) U.S. Cl.
CPC ............ *B62D 65/026* (2013.01); *B23P 19/04* (2013.01); *B25B 11/02* (2013.01)

(58) Field of Classification Search
CPC .... B62D 65/02; B62D 65/022; B62D 65/026; B25B 11/02; Y10T 29/49998; Y10T 29/53961; Y10T 29/53983; B25H 1/08; B25H 5/00
USPC ............................................. 269/289 R, 296
See application file for complete search history.

(56) References Cited

U.S. PATENT DOCUMENTS

| 2,310,255 | A | * | 2/1943 | O'Connell | B25B 1/205 269/98 |
| 2,699,601 | A | * | 1/1955 | Darnell | F16L 3/00 269/40 |
| 2,903,258 | A | * | 9/1959 | Jovanovich | B60S 5/00 269/296 |
| 3,175,636 | A | | 3/1965 | Winkelmann | |
| 3,181,642 | A | | 5/1965 | Damitz | |
| 4,206,911 | A | * | 6/1980 | Harrison | B25H 1/0007 269/296 |

(Continued)

FOREIGN PATENT DOCUMENTS

| KR | 19990030644 | 7/1999 |
| KR | 100422560 | 3/2004 |

(Continued)

*Primary Examiner* — Matthew P Travers
(74) *Attorney, Agent, or Firm* — Dinsmore & Shohl LLP

(57) ABSTRACT

A drive shaft support device that supports a drive shaft in a horizontal orientation during an assembly operation to a vehicle comprises an elongated support body and one or more drive shaft support arms that extend outward from the elongated support body. The one or more support arms include a mount portion that is mounted to the elongated support body and a support portion having a support surface that is configured to support the drive shaft thereon. A frame clamp is located at an end of the elongated support body and includes an upper support and a lower support that is spaced from the upper support to receive a frame portion of the vehicle therebetween and support the elongated body from the frame portion in the horizontal orientation.

13 Claims, 5 Drawing Sheets

(56) References Cited

U.S. PATENT DOCUMENTS

| | | | | | |
|---|---|---|---|---|---|
| 4,548,392 | A | * | 10/1985 | Rickling | F41A 23/00 269/156 |
| 5,839,181 | A | * | 11/1998 | Chu | A63B 60/00 29/281.5 |
| 6,367,788 | B1 | * | 4/2002 | Babchuk | B23K 37/0443 269/45 |
| 6,427,994 | B1 | * | 8/2002 | Stodolka | B25B 11/02 269/43 |
| 7,356,960 | B1 | * | 4/2008 | Knitt | F41A 23/16 42/94 |
| 2018/0193982 | A1 | * | 7/2018 | Weber | B25H 1/06 |
| 2018/0257186 | A1 | * | 9/2018 | Buckminster | B25B 11/02 |

FOREIGN PATENT DOCUMENTS

| | | |
|---|---|---|
| WO | 2004074029 | 9/2004 |
| WO | 2011101952 | 8/2011 |

* cited by examiner

DRIVE SHAFT SUPPORT DEVICES AND METHODS OF SUPPORTING DRIVE SHAFTS FOR ASSEMBLY

TECHNICAL FIELD

The present specification generally relates to drive shaft support devices, and more specifically, drive shaft support devices and associated methods for supporting drive shafts for installation to vehicles.

BACKGROUND

Drive shafts are used to transmit power from an engine to an opposite end of the vehicle before the power is transmitted to the wheels. Drive shafts are often used to transmit power over distances and, in that sense, can be somewhat long. The lengths of the drive shafts can make them unwieldy to install as often one end may be installed first and then an opposite end installed afterward all while the drive shafts are supported horizontally.

What is needed is a drive shaft support device that can be used to support the drive shaft in a horizontal orientation during an assembly operation.

SUMMARY

In one embodiment, a drive shaft support device that supports a drive shaft in a horizontal orientation during an assembly operation to a vehicle comprises an elongated support body and one or more drive shaft support arms that extend outward from the elongated support body. The one or more support arms include a mount portion that is mounted to the elongated support body and a support portion having a support surface that is configured to support the drive shaft thereon. A frame clamp is located at an end of the elongated support body and includes an upper support and a lower support that is spaced from the upper support to receive a frame portion of the vehicle therebetween and support the elongated body from the frame portion in the horizontal orientation.

In another embodiment, a method of supporting a drive shaft in a horizontal orientation during assembly to a vehicle is provided. The method includes locating a drive shaft support device beneath the vehicle. The drive shaft support device includes an elongated support body extending in a vehicle longitudinal direction. One or more drive shaft support arms extend outward from the elongated support body. The one or more support arms include a mount portion that is mounted to the elongated support body and a support portion having a support surface that is configured to support the drive shaft thereon. A frame clamp is located at an end of the elongated support body and includes an upper support and a lower support that is spaced from the upper support to receive a frame portion of the vehicle therebetween and support the elongated body from the frame portion in the horizontal orientation. The frame clamp is engaged with the frame portion of the vehicle such that the elongated support body extends in the vehicle longitudinal direction from the frame portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present description is generally directed to a drive shaft support device that can be used to support the drive shaft in a horizontal orientation during an assembly operation. The drive shaft support device includes an elongated support body that includes an array of drive shaft support arms that extend outwardly from the elongated support body to support surfaces that are shaped and configured to support a drive shaft thereon. The drive shaft support arms are located spaced-apart from one another in a longitudinal direction (i.e., along a length of the elongated support body). The support surfaces are provided in a U-shape recess in order to support the drive shaft both vertically and horizontally. A frame clamp is located at an end of the elongated body. The frame clamp is configured to releasably clamp onto an H-frame section of the vehicle frame. The H-frame section may be used to support an engine thereon. The frame clamp includes a release lever that can be actuated between engaged and release positions. In the engaged position, a latch member engages the H-frame section to prevent sliding movement of the drive shaft support device from the H-frame section. In the release position, the latch member moves vertically away from the H-frame section and allows for sliding movement of the drive shaft support device thereby releasing the frame clamp from the H-frame section.

Figure 1:
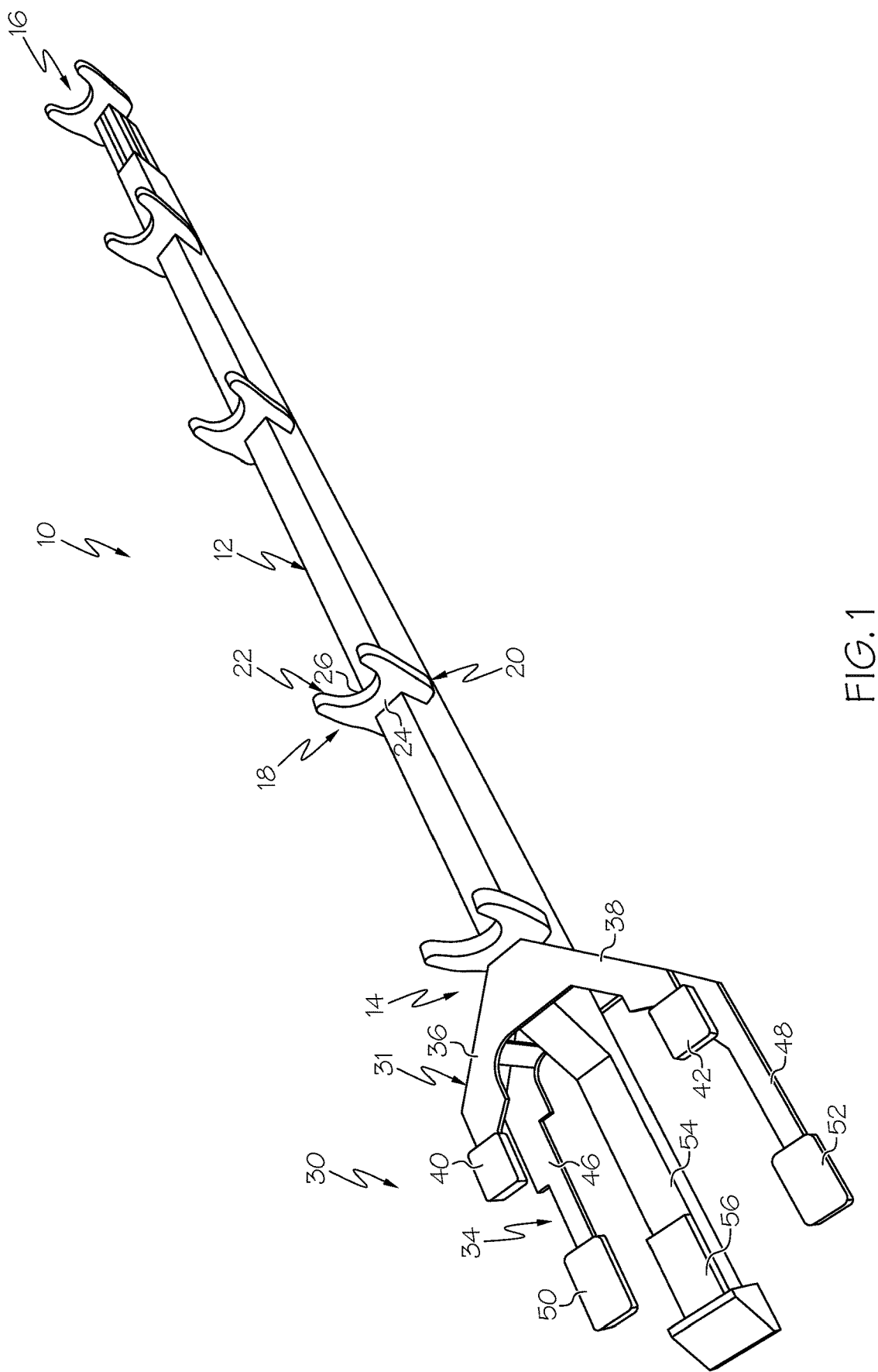
FIG. 1 is a top perspective view of a drive shaft support device, according to one or more embodiments shown and described herein.

Referring to FIG. 1, a drive shaft support device 10 includes an elongated support body 12 that is elongated in a vehicle longitudinal direction (i.e., the front-and-rear direction of a vehicle). In the illustrated embodiment, the elongated support body 12 is rectangular in cross-section; however, the elongated support body may be formed using other cross-sectional shapes, such as circular, oval, or various polygonal shapes. The elongated support body 12 has opposite terminal ends 14 and 16. Disposed between the ends 14 and 16 is an array of drive shaft support arms 18 that are connected to the elongated support body 12. The drive shaft support arms 18 are disposed spaced-apart from one another in the longitudinal direction and each includes a mount portion 20 and a support portion 22. The mount portion 20 is configured to mount to the elongated support body 12 and includes a recess 24 that corresponds to the cross-sectional shape of the elongated support body 12. The support portion 22 is configured to support a drive shaft thereon and includes a support surface 26 that is U-shaped in order to support the drive shaft both vertically and horizontally. In some embodiments, the drive shaft support arms 18 are spaced equally from one another and may be connected to the elongated support body 12 using any suitable method, such as fastening, adhesives, welding, etc. While five drive shaft support arms are illustrated, there may be more or less than five drive shaft support arms depending on, for example, a length of the particular drive shaft.

A frame clamp 30 is connected to the elongated support body 12 at the terminal end 14. The frame clamp 30 is configured to releasably clamp onto an H-frame section of the vehicle frame. The frame clamp 30 includes an upper support 31 and a lower support 34. The upper support 31 includes a first upper clamping arm 36 and a second upper clamping arm 38 that is spaced laterally from the first upper clamping arm 36. Contact pads 40 and 42 may be provided at ends of the first and second upper clamping arms 36 and 38. The contact pads 40 and 42 may be formed of a relatively soft material compared to the first and second upper clamping arms 36 and 38 suitable for engaging areas of the H-frame section.

The frame clamp 30 further includes the lower support 34. The lower support 34 includes a first lower clamping arm 46 and a second lower clamping arm 48 that is spaced laterally from the first lower clamping arm 46. Contact pads 50 and 52 may also be provided at ends of the first and second lower clamping arms 46 and 48. The lower support 34 further includes a central lower clamping arm 54. The central lower clamping arm 54 may be of greater cross-sectional dimensions than the first and second lower clamping arms 46 and 48 and provides a primary support for the elongated support body 12 when the frame clamp 30 is clamped onto the H-frame section. A contact pad 56 may also be provided on the central lower clamping arm 54.

Figure 2:
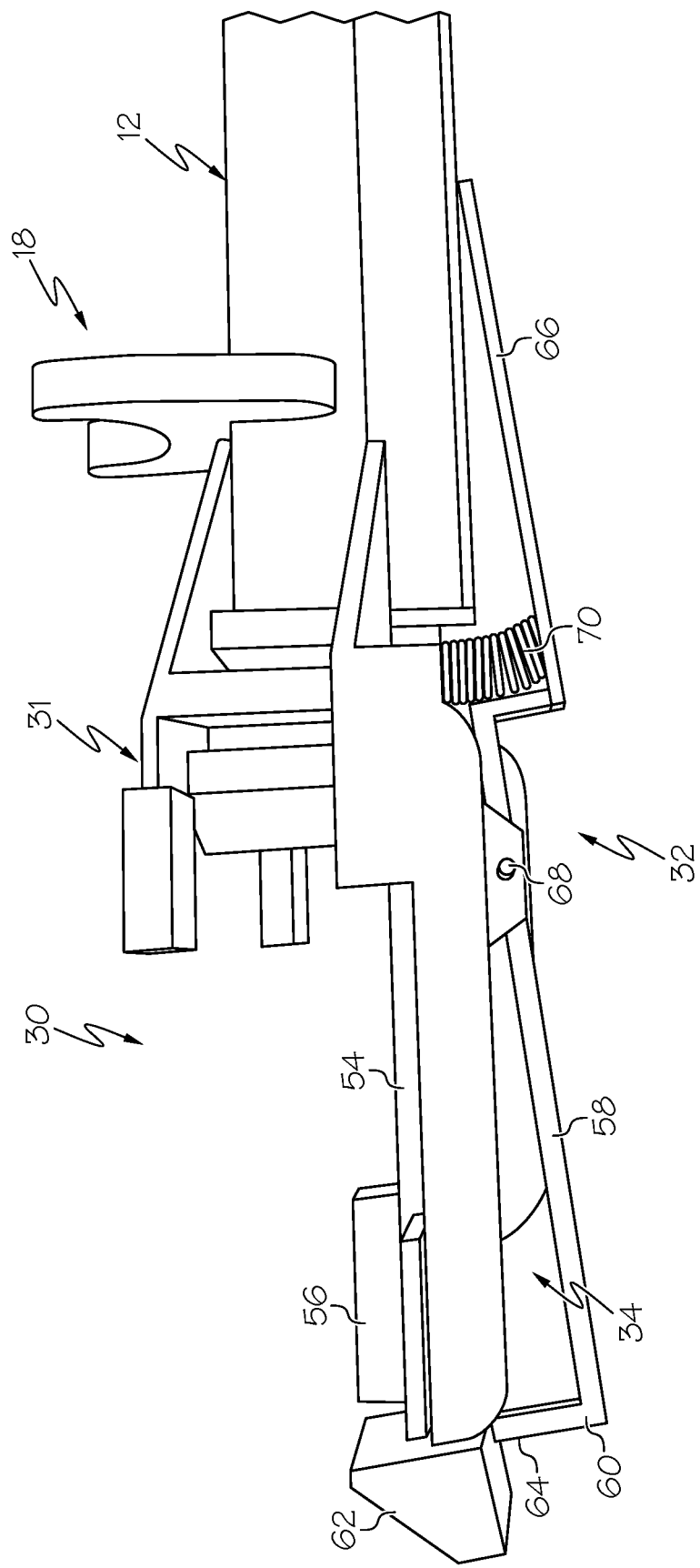
FIG. 2 is a side view of a frame clamp in a release position for use with the drive shaft support device of FIG. 1, according to one or more embodiments shown and described herein.
Figure 3:
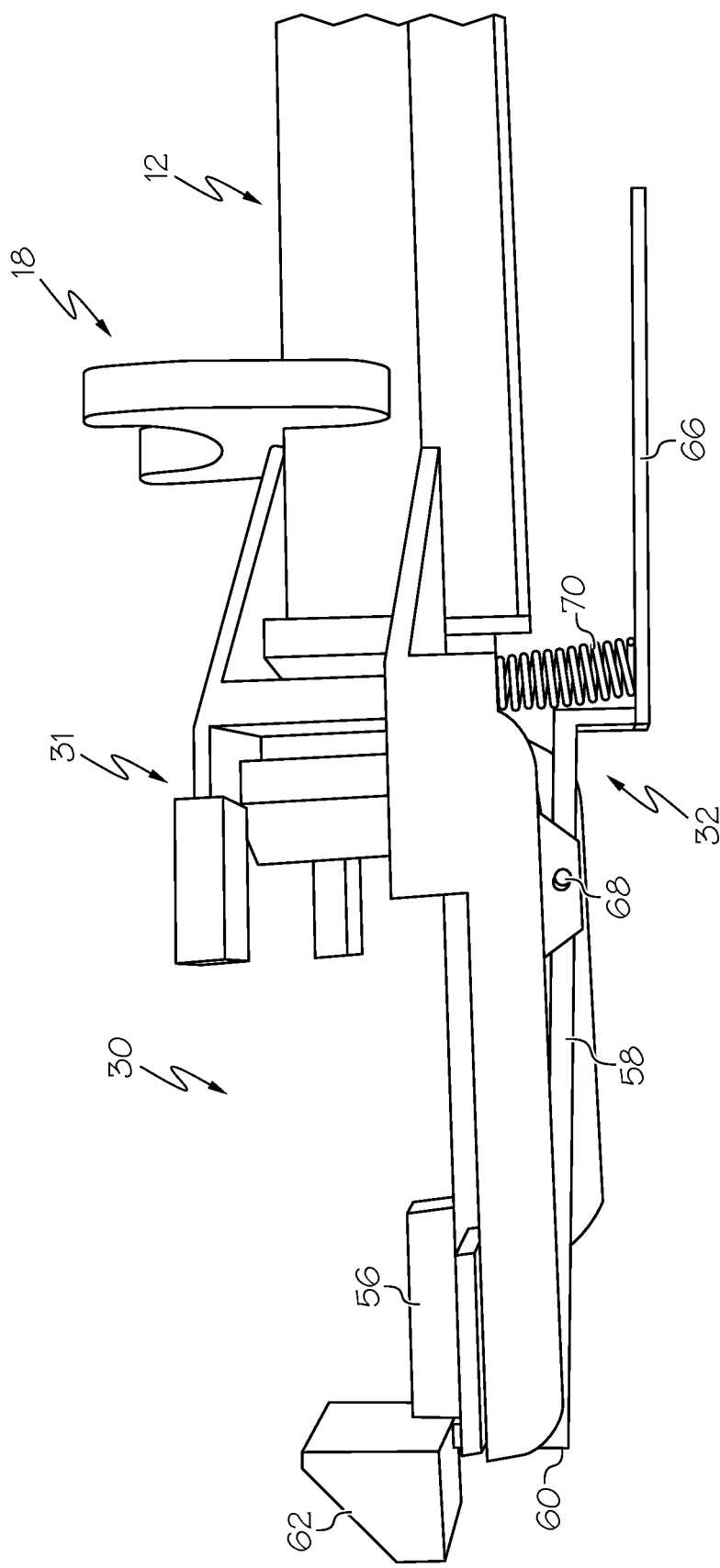
FIG. 3 is a side view of the frame clamp of FIG. 2 in an engaged position, according to one or more embodiments shown and described herein.

Referring to FIG. 2, the frame clamp 30 includes a release lever 32 that is movably connected to central lower clamping arm 54. The release lever 32 has a longitudinally extending portion 58 and a vertically extending portion 60. A latch member 62 is connected to a terminal end 64 of the vertically extending portion 60. The longitudinally extending portion 58 is connected to the central lower clamping arm 54 at a pivot location 68. A handle portion 66 extends from the longitudinally extending portion 58 to manually pivot the release lever 32 about the pivot location 68 between engaged and release positions. In the release position, shown by FIG. 2, the latch member 62 moves vertically away from the H-frame section and allows for sliding movement of the drive shaft support device thereby releasing the frame clamp 30 from the H-frame section. In the engaged position, shown by FIG. 3, the latch member 62 extends above the contact pad 56 and engages the H-frame section to prevent sliding movement of the drive shaft support device from the H-section. A spring 70 may be used to bias the release lever 32 toward the engaged position.

Figure 4:
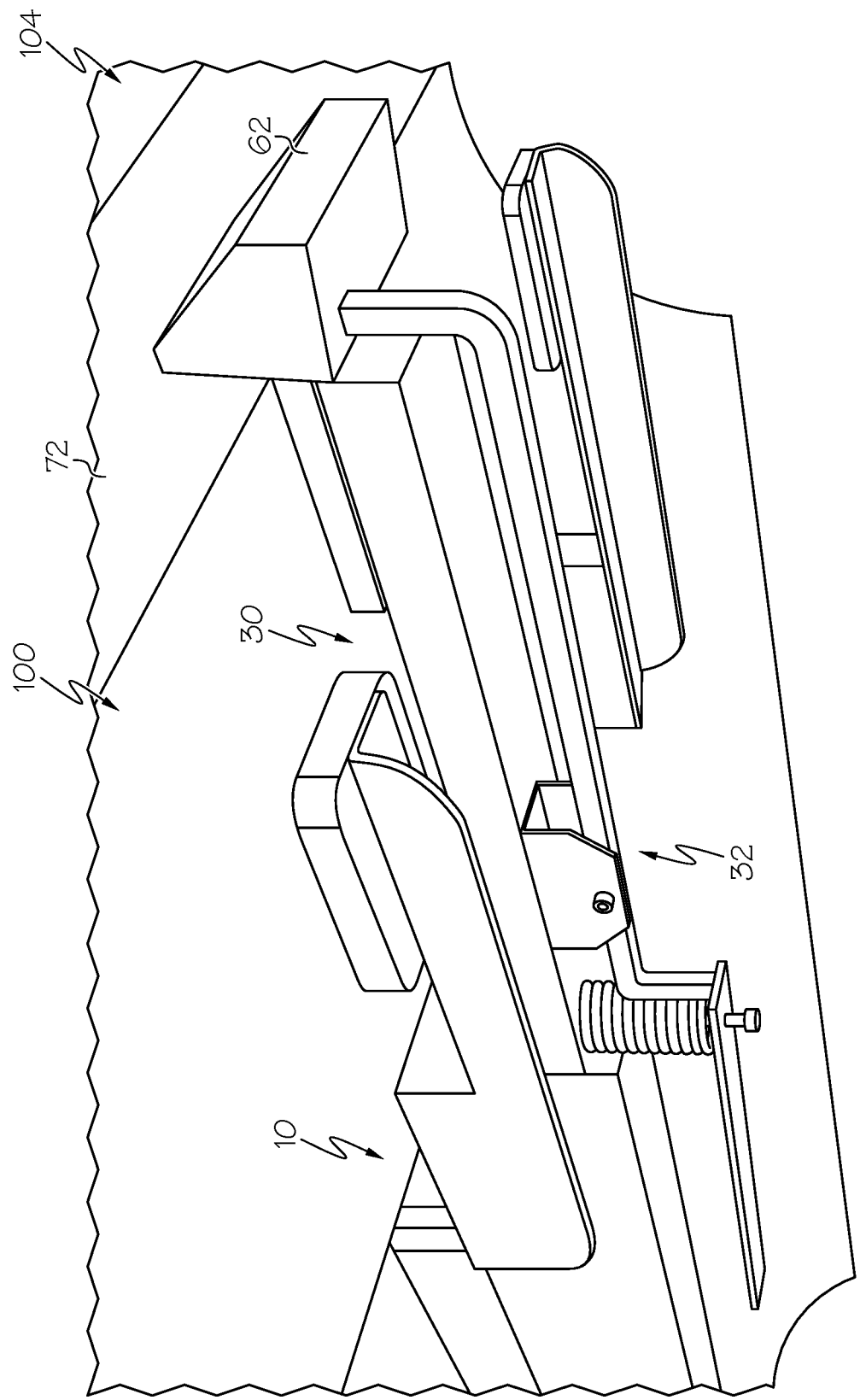
FIG. 4 is a bottom perspective view of the drive shaft support device of FIG. 1 in use, according to one or more embodiment shown and described herein.

Referring to FIG. 4, the drive shaft support device 10 is illustrated in use with the frame clamp 30 clamped to an H-frame section 72 of a vehicle 100. As can be seen, the release lever 32 is in the engaged position beneath engine 104 with the latch member 62 located at a forward side of the H-frame section 72 thereby preventing rearward sliding of the frame clamp 30 relative to the H-frame section 72.

Figure 5:
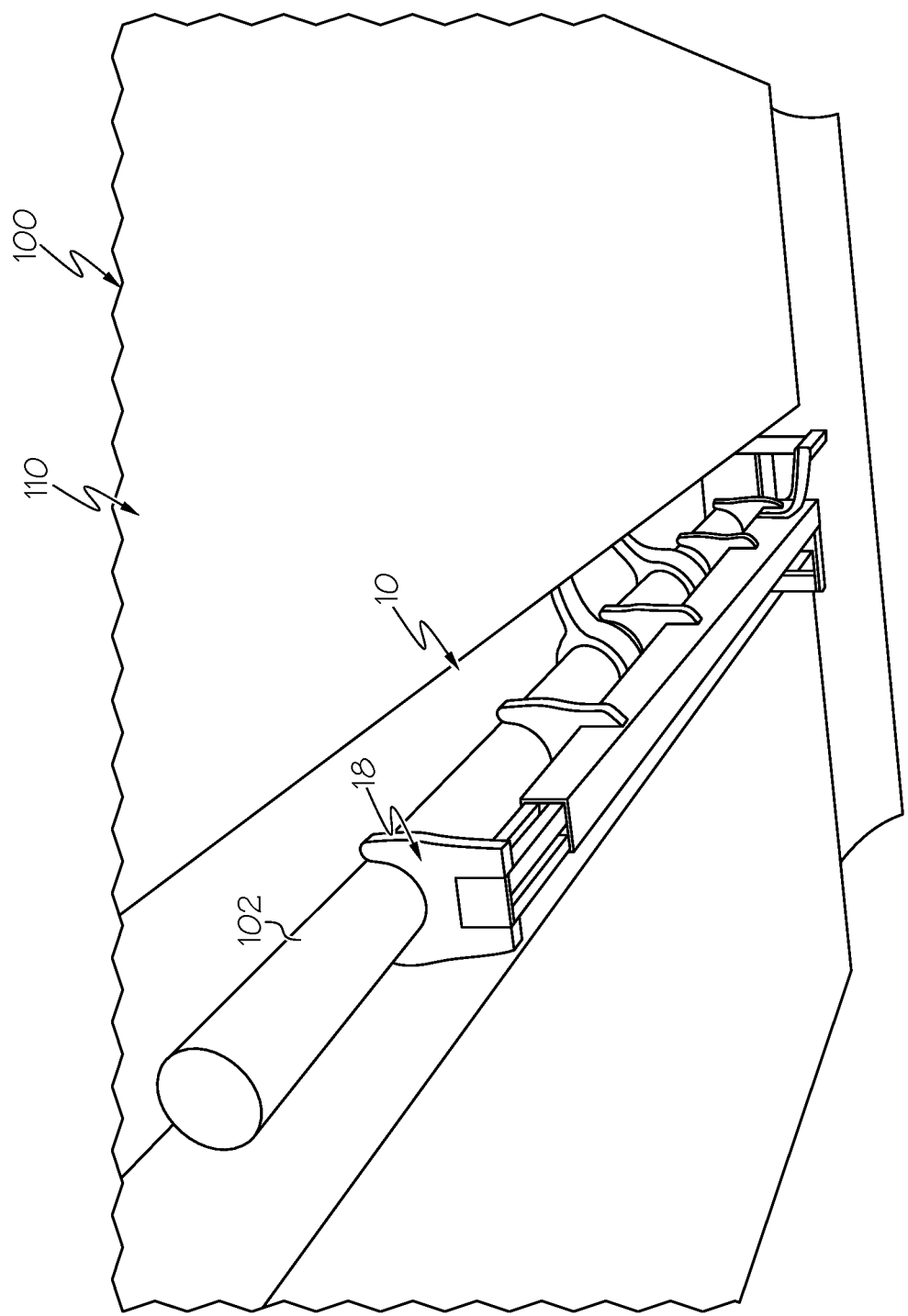
FIG. 5 is another bottom perspective view of the drive shaft support device of FIG. 1 in use, according to one or more embodiment shown and described herein.

Referring to FIG. 5, the drive shaft support device 10 is illustrated as supporting a drive shaft 102 thereon. The drive shaft 102 is supported both vertically and horizontally by the drive shaft support arms 18 at a location between the elongated support body 12 and underside 110 of the vehicle 100. In the illustrated horizontal orientation, one end of the drive shaft 102 can be connected before the opposite end.

The above-described drive shaft support devices connect to an H-frame of a vehicle using a frame clamp. The frame clamp is configured to support an elongated body of the drive shaft support devices in a cantilevered arrangement from the H-frame in order to hold a drive shaft in a horizontal orientation for installation of a vehicle. The drive shaft support devices can allow for installation of the drive shaft using only a single person.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A drive shaft support device that supports a drive shaft in a horizontal orientation during an assembly operation to a vehicle, the drive shaft support device comprising:
   an elongated support body having an elongated axis;
   one or more drive shaft support arms that extend outward from the elongated support body transversely to the elongated axis, the one or more support arms comprising a mount portion that is mounted to the elongated support body and a support portion having a support surface that is configured to support the drive shaft thereon; and
   a frame clamp comprising an elongated upper support and an elongated lower support that is spaced from and parallel to the upper support, the upper and lower support each extending beyond a terminal end of the elongated support body in a direction parallel to the elongated axis, to receive a frame portion of the vehicle therebetween and support the elongated body from the frame portion in the horizontal orientation,
   wherein the frame clamp is configured to support the elongated support body in a cantilevered arrangement when connected to the frame portion.

2. The drive shaft support device of claim 1, wherein the frame clamp comprises a release lever comprising a latch member that prevents movement of the frame clamp from the frame portion.

3. The drive shaft support device of claim 2, wherein the release lever is pivotally connected to the lower support such that the release lever and latch member pivot between an engaged position that prevents movement of the frame clamp from the frame portion and a release position that allows movement of the frame clamp from the frame portion.

4. The drive shaft support device of claim 3, wherein the lower support comprises a lower clamping arm that extends outward longitudinally from the end of the elongated support body, the release lever pivotally connected to the lower clamping arm.

5. The drive shaft support device of claim 1, wherein the support portion of the one or more drive shaft support arms is U-shaped.

6. The drive shaft support device of claim 5 comprising an array of drive shaft support arms that are spaced apart along a length of the elongated support body.

7. A method of supporting a drive shaft in a horizontal orientation during assembly to a vehicle, the method comprising:
  locating a drive shaft support device beneath the vehicle, the drive shaft support device comprising:
    an elongated support body extending in a vehicle longitudinal direction;
    one or more drive shaft support arms extending outward from the elongated support body, the one or more support arms comprising a mount portion that is mounted to the elongated support body and a support portion having a support surface that is configured to support the drive shaft thereon; and
    a frame clamp is located at an end of the elongated support body and comprises an upper support and a lower support that is spaced from the upper support to receive a frame portion of the vehicle therebetween and support the elongated body from the frame portion in the horizontal orientation;
  engaging the frame clamp with the frame portion of the vehicle such that the elongated support body extends in the vehicle longitudinal direction from the frame portion.

8. The method of claim 7 further comprising locating the drive shaft on the support surface of the one or more drive shaft support arms thereby supporting the drive shaft in the horizontal orientation.

9. The method of claim 7, wherein the frame clamp comprises a release lever comprising a latch member that prevents movement of the frame clamp from the frame portion.

10. The method of claim 9, wherein the release lever is pivotally connected to the lower support such that the release lever and latch member pivot between an engaged position that prevents movement of the frame clamp from the frame portion and a release position that allows movement of the frame clamp from the frame portion.

11. The method of claim 10, wherein the lower support comprises a lower clamping arm that extends outward longitudinally from the end of the elongated support body, the release lever pivotally connected to the lower clamping arm.

12. The method of claim 7, wherein the support portion of the one or more drive shaft support arms is U-shaped.

13. The method of claim 12 comprising an array of drive shaft support arms that are spaced apart along a length of the elongated support body.

* * * * *